Sept. 18, 1945.  J. H. WORTHEN  2,385,122
BORE GAUGE
Filed Sept. 2, 1943  2 Sheets-Sheet 1
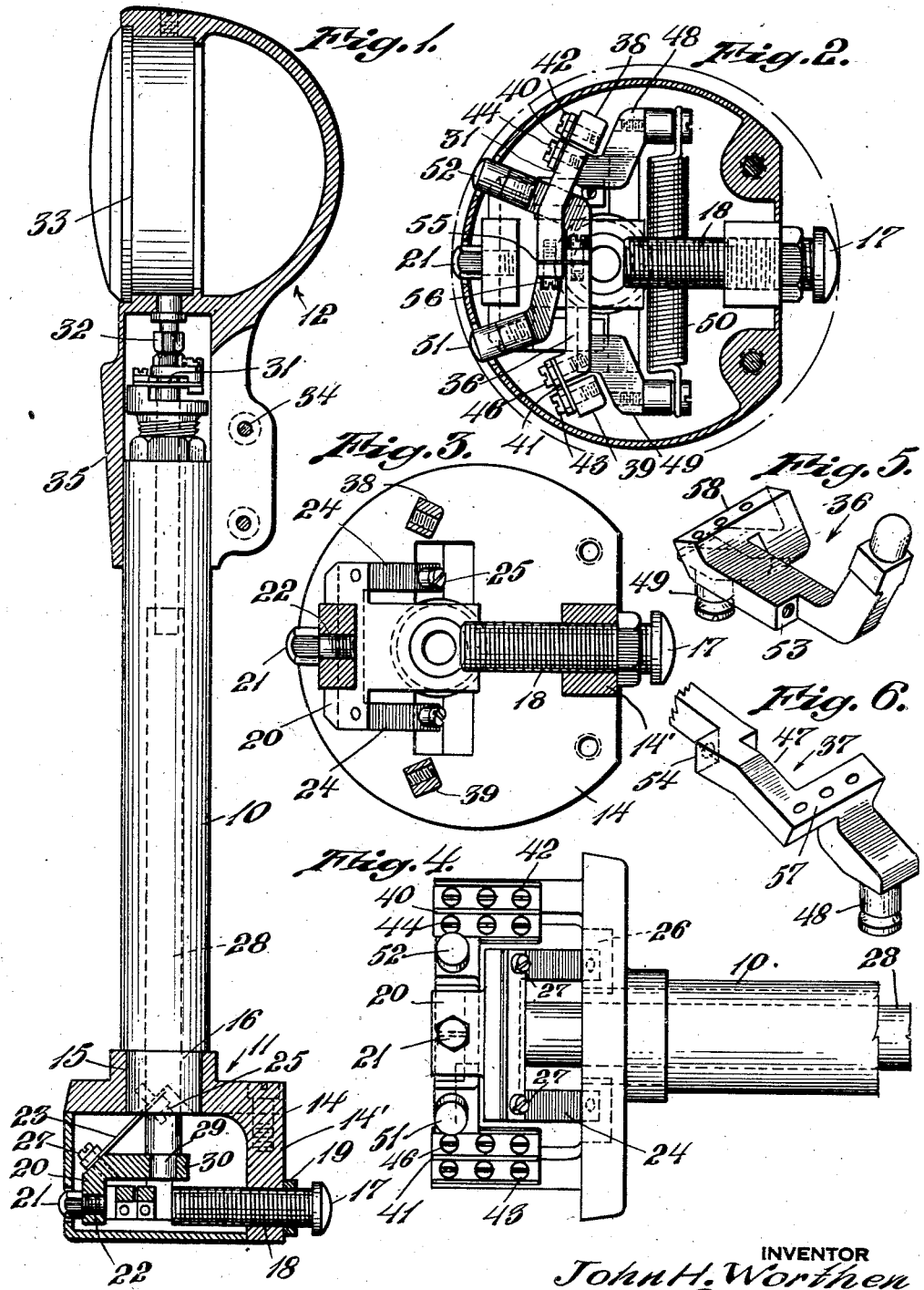
INVENTOR
John H. Worthen
BY Barlow & Barlow
ATTORNEYS Sept. 18, 1945.  J. H. WORTHEN  2,385,122
BORE GAUGE
Filed Sept. 2, 1943  2 Sheets-Sheet 2

INVENTOR
John H. Worthen
BY Barlow & Barbou
ATTORNEYS

UNITED STATES PATENT OFFICE 2,385,122

BORE GAUGE

John H. Worthen, Providence, R. I., assignor to Federal Products Corporation, a corporation of Rhode Island Application September 2, 1943, Serial No. 501,014

9 Claims. (Cl. 33—178)

This invention relates to a bore gauge and more particularly to the locating studs and the manner of mounting these studs for assisting in the action of the measuring studs.

In a bore gauge of the character here referred to pivoting or sliding parts cause error in the gauge due to the friction and also wear of the parts due to continual movement. Gauges of this character are also difficult to manufacture in a manner so that accuracy is maintained.

One of the objects of this invention is to provide a gauge which will have great accuracy and yet will be less expensive to manufacture than some of the gauges which are at present on the market.

Another object of the invention is to provide a gauge in which no friction enters into the reading due to relative movement of the parts.

Another of the objects of this invention is to provide a mounting for the locating studs so that they will move with little or no friction although maintain their proper position for the location of the measuring studs in the instrument.

Another object of this invention is to hingedly mount locating studs in such a manner as to avoid friction in their movement and also to cause their movement to be substantially in the plane with one of the measuring studs and always equally distant from the measuring studs.

With these and other objects in view, the invention consists of certain novel features of construction, as will be more fully described and particularly pointed out in the appended claims.

In the accompanying drawings:

Fig. 1 is a side elevation partly in section illustrating the gauge and dial indicator at the upper end thereof;

Fig. 2 is a section substantially in the plane of the measuring and locating studs of the head of the gauge;

Fig. 3 is a section similar to Fig. 2 with the locating studs omitted;

Fig. 4 is an elevation rotated through ninety degrees showing the head as viewed from the left of Fig. 1 with the cover removed.

Fig. 5 is a perspective view of one of the locating studs;

Fig. 6 is a perspective view of another of the locating studs.

Figure 7:
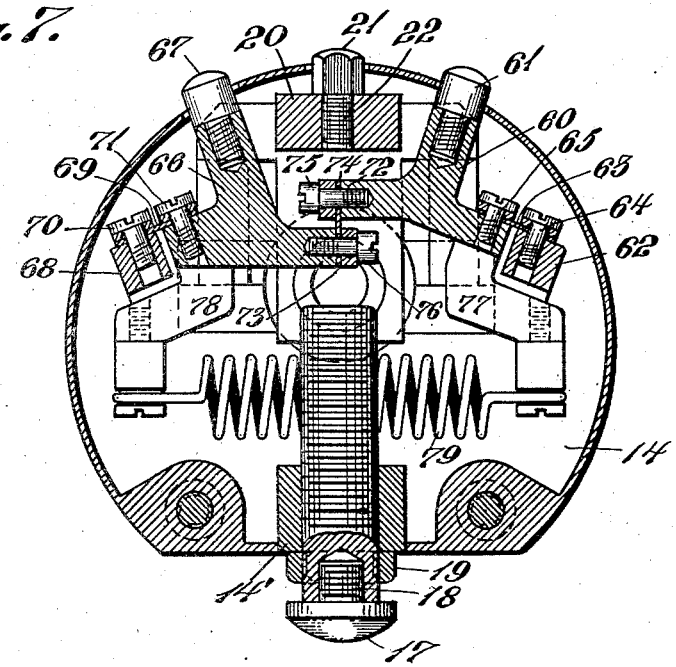
Fig. 7 is a section of a modified arrangement.

In a bore gauge it is desirable that the measurements of a diameter be taken by contacting the wall surfaces by studs which move in a plane passing through the diameter of the bore to be measured and also that there be locating studs so arranged as to assist in the location of the gauge for such a measurement. Geometrically the location of the locating studs should be equally distant from the measuring stud and they will be so arranged as to cause proper position of the instrument in a bore in which the measuring studs function. I have mounted locating studs independently for movement but have resiliently tied these together so that they will move together and always be equally distant from the measuring studs, they being located more closely to the movable measuring studs so as to move therewith as different diameters of the bores are encountered.

With reference to the drawings 10 designates a tubular body having a measuring head 11 at one end and a dial indicating casing 12 mounted on the body 10 at the other end.

The measuring head 11 comprises a frame composed of a disk 14 with a downwardly extending arm 14'. A bore 15 within disk 14 receives the reduced portion 16 of the body to be held thereon.

This frame arm 14' carries a fixed measuring stud 17 which has a threaded shank 18 for adjustment in the frame to be held in such adjusted position by a nut 19. A shoe 20 carries a movable measuring stud 21 threadingly inserted thereinto as at 22 and which is supported in the frame 14 by the leaf spring 23 generally U-shape in plan and having its arms 24 held by screws 25 in the recesses 26 of the portion 14 of the frame for supporting the leaf spring 23 substantially in a position at forty-five degrees to the tubular body 10 and in which line is the contacting tip of the measuring stud 21. The other ends of the arms of this U-shape spring 23 are attached by bolts 27 to the shoe 20 as shown in Figures 1 and 4.

The measuring rod 28 is reduced as at 29 and fits into a bore 30 in the shoe 20 for securing the measuring rod to this shoe which carries the measuring stud. By the disposition of the spring 23 at 45 degrees to the rod, movement of the stud 21 will deliver corresponding amount of movement longitudinally to the rod 28. This rod 28 will be drawn down by movement inwardly of the stud 21, which movement is permitted by the leaf spring 31 for mounting the upper end of the rod 28 with reference to the body 10 while the follower or feeler 32 of the dial gauge designated generally 33 being under spring pressure will follow movement of the rod 28 downwardly and transfer a corresponding indication to the pointer of the dial gauge mounted in the casing or housing 12. The housing 12 is adjustably held on the body 10 by the bolt means 34 for closing the split tubular portion 35 thereof.

In order to locate the measuring studs in position I have provided a pair of arms which are designated in Figures 5 and 6 as 36 and 37 and have hingedly mounted these arms in the head by means of leaf springs 40 and 41 upon suitable supports 38 and 39 extending from the disk 14 (see Figure 3). Spring 40 is fastened to the support 38 by the bolt 42 while the leaf spring 41 is fastened to the support 39 by the bolt 43. The other end of the spring 40 is fastened to the surface 57 of the arm 37 by the three bolts 44 while the other end of the spring 41 is fastened to the surface 58 of the arm 45 by the three bolts 46. These arms are not of the same shape but are so designed that one will cross the other without contact therewith while providing for some freedom of movement of each of the arms relative to the other. The arm 37 has a portion 47 which reaches over the arm 36. By this arrangement of crossing much longer arms may be had from their point of pivotal action so that the arcs which their points describe will be relatively long and will give minimum change of distance from the diametrical plane in which the measuring studs operate.

The arm 37 is provided with a rearwardly extending portion 48 while the arm 36 is provided with a rearwardly extending portion 49 which portions are connected together by a coil spring 50 tending to draw these rearwardly extending portions toward each other and to swing the locating studs 51 and 52 on the other ends of these arms outwardly of the head.

In order to connect the locating arms together an abutment surface 53 is provided on the arm 36 and abutment surface 54 on the arm 37. A leaf spring 55 is attached to these two abutment surfaces by bolts 56. This leaf spring although permitting some relative movement of the studs 51 and 52 while working causes the studs to move together and tends to maintain its position substantially in the plane of the movement of the measuring studs.

In operation the fixed measuring stud 17 will be adjusted so that the normal distance between it and the movable measuring stud when the parts are at rest are close to the sides of the bore to be measured. The distance between the measuring studs will be a little greater than the diameter of the bore to be measured. The casing is slid onto the body until the pointer of the dial gauge is in a position to move in either direction from a zero datum line. The gauge when used is positioned in the bore and the locating studs will assist in causing the measuring studs to assume a diametrical position across the bore. By then rocking the instrument the movable measuring stud 21 which will contact the bore of the wall to be measured will indicate plus and minus from a certain value and this minimum value will be the determination of the diameter of the bore.

It will be apparent that the movement of the measuring stud 21 will transmit a similar movement to the rod 28 which will move downwardly permitted by the spring 31 which is a leaf spring type of mounting as will be more fully described in my co-pending application filed of even date herewith. The frictionless mounting of the measuring stud 21 permits it to move along a relatively small arc which is found to be very accurate. The mounting of the locating studs by reason of the leaf springs eliminates wear and friction by the swinging movement of these studs and provides for great accuracy. The arms may swing about a point equally distant from the plane of measuring studs with very little effort while they are so located as to be in the plane of the fixed stud 17, which plane is at right angles to the body of the instrument.

In the modified showing of Fig. 7 the arms are shaped differently than shown in Figs. 5 and 6 and are of less extent from their hinged mounting. One arm 60 carrying a contact point 61 is hingedly mounted on the post 62 by the leaf spring 63 which is secured to the post by the bolt 64 and to the arm by the bolt 65. The other arm 66 has a contact point 67 and is hingedly mounted on the post 68 by the leaf spring 69 secured to the post by the bolt 70 and to the contact arm by the bolt 71. Each of these leaf springs mount the arms so that the contact arms swing in the same plane. Abutment surfaces 72 on the arm 60 and 73 on the arm 66 are engaged by leaf spring 74 held to the arm 72 by the bolt 75 and held to the arm 73 by the bolt 76 so as to secure these arms together to cause them to move together that their contact points 61 and 67 will simultaneously move toward and from the diametrical lines of the measuring points each in themselves equally distant therefrom as heretofore described for the contact points 51 and 52.

The arm 60 has a rearward extension 77 while the arm 66 has a rearward extension 78 similar to the rearward extension 48 and 49 heretofore described. These extension are engaged by coiled spring 79 which serves the same purpose as the coil spring 50 heretofore described and tends to move the contact points 61 and 67 outwardly with reference to the body casing.

The remaining parts illustrated in Fig. 7 are the same as the parts heretofore described and will not be duplicated in this description.

The modification shown in Fig. 7 will serve the purpose of that shown in the foregoing figures especially where very small movement of the contact studs is required. Where a greater variation in bores to be measured is to be encountered the construction shown in Fig. 1 or Fig. 2 would be preferable.

I claim:

1. In a gauge the combination of a head, two measuring studs in said head for engagement with the walls of an object to be measured, one of said studs being movable in a plane toward and from the other stud, means including a pointer actuated by said movable stud, two locating studs in said head on either side of and equidistant from the measuring studs, means for mounting said locating studs to swing about spaced axes each at right angles to a plane common to the measuring and locating studs.

2. In a gauge the combination of a head, two measuring studs in said head for engagement with the walls of an object to be measured, one of said studs being movable in a plane toward and from the other stud, means including a pointer actuated by said movable stud, two locating studs in said head on either side of and equidistant from the movable measuring stud, means for mounting said locating studs to move together about spaced axes each at right angles to the plane of the measuring and locating studs and at points equidistant from the plane of movement of the movable measuring stud.

3. In a gauge the combination of a head, two measuring studs in said head for engagement with the walls of an object to be measured, one of said studs being movable in a plane toward and from the other stud, means including a pointer actuated by said movable stud, two locating studs in said head on either side of and equidistant from the measuring studs, means including spaced sheet metal flexible hinges for mounting said locating studs to swing at right angles to a plane common to the measuring and locating studs about separate axes.

4. In a gauge the combination of a head, two measuring studs in said head for engagement with the walls of an object to be measured, one of said studs being movable in a plane toward and from the other stud, means including a pointer actuated by said movable stud, two locating studs in said head on either side of and equidistant from the measuring studs, leaf springs for mounting said locating studs to swing in a plane common to each other and to one of the measuring studs and about axes at right angles to said plane.

5. In a gauge the combination of a head, two measuring studs in said head for engagement with the walls of an object to be measured, one of said studs being movable in a plane toward and from the other stud, means including a pointer actuated by said movable stud, two locating studs in said head on either side of and equidistant from the movable measuring studs, leaf springs for mounting said locating studs to move about spaced axes each at right angles to the plane of the measuring and locating studs and at points equidistant from the plane of movement of the movable measuring stud.

6. In a gauge the combination of a head, two measuring studs in said head for engagement with the walls of an object to be measured, one of said studs being movable in a plane toward and from the other stud, means including a pointer actuated by said movable stud, two locating studs in said head on either side of and equidistant from the measuring studs, crossed arms for mounting said locating studs and means for swingably mounting said arms to move in a plane common to each other and to one of the measuring studs.

7. In a gauge the combination of a head, two measuring studs in said head for engagement with the walls of an object to be measured, one of said studs being movable in a plane toward and from the other stud, means including a pointer actuated by said movable stud, two locating studs in said head on either side of and equidistant from the measuring studs, crossed arms for mounting said locating studs and a leaf spring for swingably mounting said arms to move in a plane common to each other and to one of the measuring studs and resilient means connecting said arms to cause them to move together.

8. In a gauge the combination of a head, two measuring studs in said head for engagement with the walls of an object to be measured, one of said studs being movable towards and from the other stud, means including a pointer actuated by said movable stud, two locating studs in said head on either side of and equidistant from the movable stud, means for mounting said locating studs to swing about spaced axes each at an angle to a plane passing through said two measuring and locating studs.

9. In a gauge the combination of a head, two measuring studs in said head for engagement with the walls of an object to be measured, one of said studs being movable towards and from the other stud, a pointer, a rod for transmitting motion of said movable stud to said pointer, two locating studs in said head on either side of said movable stud, means for mounting said locating studs to swing about axes parallel to said rod.

JOHN H. WORTHEN.